US006404765B1

United States Patent
Bernstein et al.

(10) Patent No.: US 6,404,765 B1
(45) Date of Patent: Jun. 11, 2002

(54) METHOD AND APPARATUS FOR TRANSPORTING DS-X SIGNALS THROUGH A PACKET NETWORK

(75) Inventors: Greg M. Bernstein; Premal Desai, both of Fremont; Jeffrey T. Gullicksen, Santa Clara, all of CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/073,658

(22) Filed: May 6, 1998

(51) Int. Cl.[7] .............................................. H04L 12/56
(52) U.S. Cl. ...................................... 370/389; 370/397
(58) Field of Search ................................ 370/389, 390, 370/395, 396, 397, 399, 354, 466, 352, 465, 470, 467, 474, 477, 355, 420, 463, 401, 411, 419, 391

(56) References Cited

U.S. PATENT DOCUMENTS

| | | | | |
|---|---|---|---|---|
| 5,452,297 A | * | 9/1995 | Hiller | 370/395 |
| 5,809,022 A | * | 9/1998 | Byers | 370/395 |
| 6,125,117 A | * | 9/2000 | Martin | 370/397 |
| 6,219,348 B1 | * | 4/2001 | Allen | 370/354 |
| 6,226,264 B1 | * | 5/2001 | Shibata | 370/232 |

* cited by examiner

Primary Examiner—Douglas Olms
Assistant Examiner—Ricardo M. Pizarro
(74) Attorney, Agent, or Firm—Kevin L. Smith; Neil Mothew (57) ABSTRACT

A method and apparatus for efficiently transporting DS-X traffic in packet form over an ATM or other packet network. Specifically, virtual connection or slot provisioning and/or cell concentration techniques are used to compact the amount of DS-X traffic broadcast between communications system devices such as the access mux and the communications switch and spare bandwidth. In provisioning, a configured DS-X loading of an end node supporting DS-X traffic is ascertained. In turn, a minimum number of virtual connections for bearing packetized DS-X traffic are established, either at communications system configuration or as needed. In concentration processing, a dynamic association between the virtual connections and the DS-X traffic is established, typically on a per frame basis. Only those digital channels entering the node within a given time frame which actually bear DS-X traffic will be assigned a slot within packet. Concentration may be augmented by provisioning to further reduce bandwidth requirements. In other disclosed aspects, permanent virtual channels or PNNI soft permanent virtual connections may be used for the virtual connections where ATM is chosen as the transport protocol.

14 Claims, 5 Drawing Sheets

| | 1 | | | | | | | 8 | 9 | | | | | | | 16 | 17 | | | | | | | 24 | 25 | | | | | | | 32 | 33 | | | | | | | 40 | 41 | | | | | | | 48 | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | A | B | C | D | E | F | G | H | I | J | K | L | M | N | O | P | Q | R | S | T | U | V | W | X | Y | Z | A | B | C | D | E | F | G | H | I | J | K | L | M | N | O | P | Q | R | S | T | U | V | VC1 |
| | | | | | | | | | | | | | | | | | | | | | | | | | | | A | B | C | D | E | F | G | H | I | J | K | L | M | N | O | P | Q | R | S | T | U | V |
| | | | | | | | | | | | | | | | | | | | | | | | | | | | | | | | | | | | | | | | | | | x | x | x | x | x |

700

710 AD$_1$
720 AD$_2$
730 AD$_3$
740 X

METHOD AND APPARATUS FOR TRANSPORTING DS-X SIGNALS THROUGH A PACKET NETWORK

CROSS-REFERENCE TO RELATED APPLICATIONS

This application is related to U.S. patent application Ser. No. 08/746,230, entitled "Architecture for Distribution Of Voice Over ATM Networks", filed Nov. 7, 1996 naming Greg M. Bernstein as inventor, which is incorporated herein fully by reference.

BACKGROUND

1. Field of the Invention

This invention relates to streaming data transmission (e.g. voice) over packet networks, and is particularly concerned with bandwidth-efficient and reliable DS-X transmission within distributed communication systems utilizing a packet network.

2. Description of the Related Art

Transferring streaming media, particularly voice and video, over a packet network presents challenges not faced with traditional time-switched systems. Traditional packet transport technologies and network/application protocols, such as TCP/IP FTP, and Ethernet are optimized for reliable data transfer, rather than the timeliness of the transfer. While such characteristics are great for transferring a data file or an application that will not work even if a small piece of data is corrupt or missing, connection and delivery confirmation delays make the transmission of time-sensitive streaming media less desirable.

Switched-packet Asynchronous Transfer Mode (ATM) does represent a convenient standard for transmitting voice, data, and video signals at very high speeds (25 Mbits/sec and higher) over packet networks. The increasing deployment of ATM-based networks, particularly on customer premises, has created a demand to provide high quality transport, switching, and call processing of voice communications over a packet-oriented network with minimal delay. The delay must not exceed that currently permitted for traditional centralized Private Branch Exchanges (PBXs), and the voice quality must be at least as good as such systems to warrant upgrading distributed ATM voice services.

Figure 1:
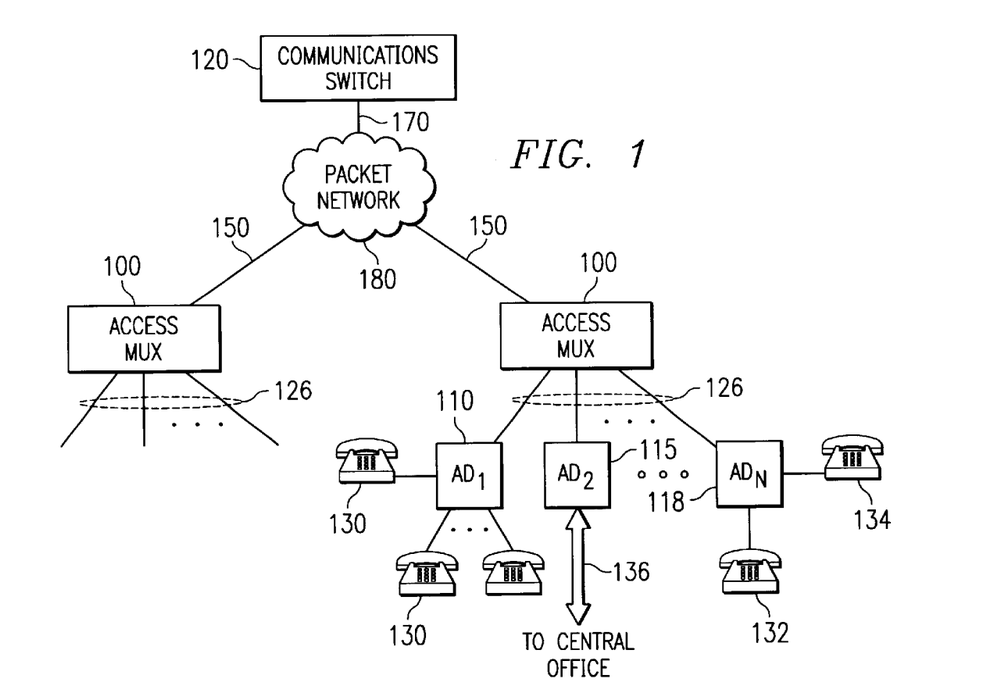
FIG. 1 is a block diagram of a known distributed PBX architecture utilizing a packet network transport.

A known distributed PBX architecture leveraging an ATM-based network is shown in FIG. 1. This PBX architecture includes several end node devices (e.g. access multiplexors 100, communications switch 120) distributed at the edges of a packet network transport. Access multiplexors 100 (access mux) are coupled to the ATM network (or single switch) 180 via links 150 carrying ATM cell traffic at STS-1/OC-1 speeds or higher. These muxes 100 convert locally-originated, digital channels representing e.g. PCM-encoded voice/data traffic at DS-X speeds (i.e. the US plesiochronous digital hierarchy DS-0, DS-1, DS-2, DS-3, DS-4, etc. or the European E-1, E-2, . . . , hereinafter referred to as "DS-X traffic") into packets, receive and reconstruct remotely-originated voice/data packets back into native DS-X form, and route each to their intended destinations. High speed link 170 (e.g. SONET STS-3c, OC-12) couples the communications switch 120 to the packet network 180. Logical or virtual connections, known in ATM parlance as virtual channels, are established between the access muxes 100 and the communications switch 120 within the packet network 180 to permit transfer, call processing and switching of the packetized DS-X traffic.

As with the case with traditional centralized PBX systems, synchronous Access Devices (ADs) 110, 115 and 118 are coupled to these access muxes 100 to collect voice/data information (such as a 64 Kbps DS-0 voice channel) originating from telephony devices such as digital/analog extensions 130/132 or videophone 134, as well as T1/E1 trunks 136. Once collected using known time-division multiplexing techniques, the ADs relay synchronous DS-X traffic to the access mux 100 using signal lines 120. Of course, ADs 110, 115, 118 are also used to distribute outgoing DS-X traffic extracted by the access mux 100 over the signal lines 120 to the appropriate destination telephony device or trunk.

In order to leverage the ATM network for voice communications, each access mux 100 converts DS-X traffic into ATM cells. According to the ATM standard, each cell is a fixed fifty-three bytes or octets long including a forty-eight byte payload and a five byte header. For outgoing calls, each access mux 100 packs the DS-X traffic into the 48-byte payload using conventional methods for multiplexing voice DS0s into ATM virtual channels, such as T1/E1 Circuit Emulation Service (CES) based on ATM Adaptation Layer 1(AAL 1) or other ATM adaptation layers for carrying voice. For incoming calls, each access mux determines the destination of the DS-X traffic encapsulated within each received cell based in part on the virtual channel or path information contained in the cell as well as its location within the cell payload. The access mux 100 then converts the packets to the carrier format for the signal line(s) 120 corresponding to the intended destination device.

However, without further refinement, this architecture is prone to cell delay (especially where the customer's packet network is complex or geographically diverse), which can seriously degrade the quality of service for voice and streaming data it is slated to carry. To minimize cell-fill delay here, which can form a major component of the overall architecture delay, it has been proposed that each DS-0 channel serviceable by the access mux 100 contributes one byte to the ATM cell(s) and the so-filled cells are transported within a 125 $\mu$sec frame, corresponding to the well-established 8 KHz sampling rate for voice. To reduce communication switching setup, complexity and delay, as well as simplify cell composition/decomposition logic within each access mux 100, each available DS-0 is statically assigned to a unique octet slot within one of the cells filled and transported within the 125 $\mu$sec frame. To further simplify network complexity, along with minimizing dynamic connection setup and tear down delays associated with ATM switched virtual channels (SVCs), permanent virtual channels (PVCs) are established within the packet network 180 at system configuration through management action to transport the DS-0 packed cells between the access mux 100 and the switch 120.

In applying these techniques to the architecture of FIG. 1, a number of Constant Bit Rate (CBR) PVCs capable of bearing the simultaneous DS-0 capacity of each access mux 100 is established within the packet network 180. A PVC will be used to bear one ATM cell per 125 $\mu$sec frame, and cell payload will contain a byte of data from each of 48 DS-0 channels statically mapped into its 48 octet slots. Since the placement of the DS-0 byte within a particular PVC and octet slot identifies the DS-0 connection (originating/terminating device), all cells must be broadcast within a given 125 $\mu$sec frame, whether or not traffic actually exists on the connection. Typically, cell octet slots corresponding to DS-0 channels not bearing activity within a given frame are stuffed with pre-established "don't care" data.

Figure 3:
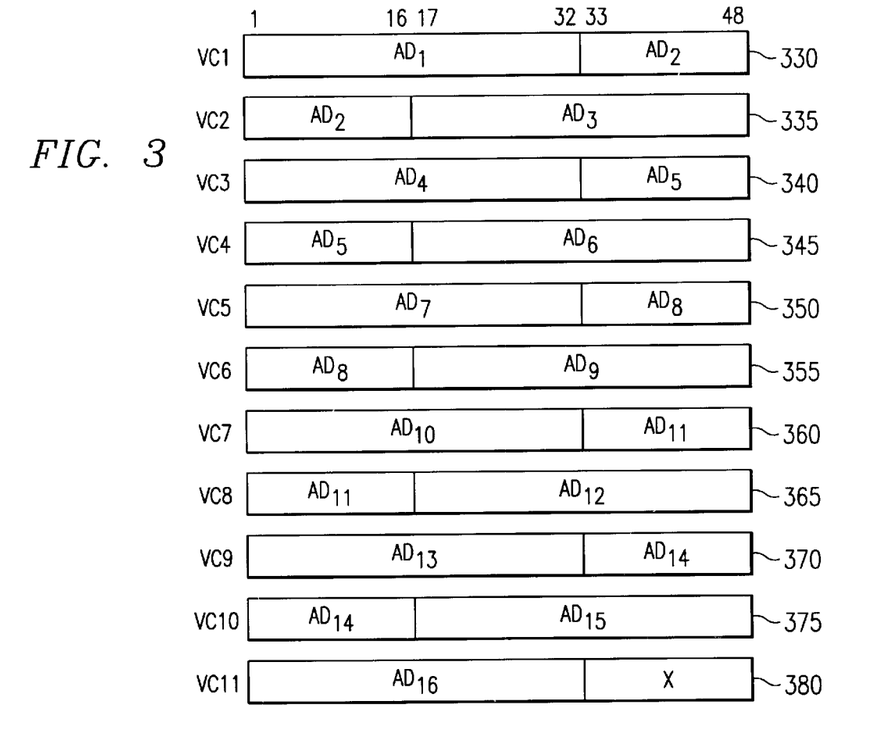
FIG. 3 diagrammatically illustrates conventional DS0 mapping into ATM cells.

In the above-stated combination, these design choices seriously impact bandwidth efficiency. For example, if the access muxes 100 could simultaneously service sixteen (16) ADs, each defining thirty-two (32) DS-0 channels (which is typical for such units), a minimum of 512 DS-0 channel bytes would accordingly need to be transferred every 125 μsec frame, whether or not traffic actually exists on those channels. Eleven PVCs would be required to fully transport these bytes with padding left over, and accordingly eleven ATM cells would need to be transmitted every frame. FIG. 3 graphically indicates the DS0 mapping required for the 16 32 DS-0 channel ADs plotted against the payload portions of the cells 330–380 to be filled, with "X" representing 16 empty octet slots at the end of the last cell 380 which are padded out in order to complete the payload. Thus, in this example, regardless of the actual DS-0 loading (meaning the number of DS-0 channels actually allocated or reserved for use) or active DS-0 traffic experienced, approximately 37.3 Mbits/sec of bandwidth would be required, exclusive of any control signaling. In view of the fact that this represents almost a quarter of the available bandwidth of an STS-3c link, and that the access mux 100 almost never experiences full loading (and is actually quite sparse in the typical PBX application), this configuration appears to be an undesirable choice where the packet network 180 is not devoted exclusively for PBX transport.

Such inefficiencies are carried over and magnified at the communications switch 120. According to the architecture of FIG. 1, communications switch 120 will be responsible for handling switching and call management responsibilities for the packetized DS-X traffic generated by and destined for each access mux 100. Assuming that each access mux 100 contributes 37.3 Mbits/sec of bandwidth, the link 170 must be able to bear A*37.3 Mbits/sec, exclusive of control and management signals, where A represents the number of access muxes 100 serviced by the communication switch 120. Thus, link 170 must typically support a magnitude higher simultaneous bandwidth than links 150 (e.g. OC-12 vs. STS-3c), which adds to the cost and complexity to communications switch 120.

Moreover, it should be realized that the enormous number of traffic bearing cells entering the communications switch 120 packed according to the above-described techniques and criteria require commensurately enormous and expensive computing resources within the switch 120 if switching and call management responsibilities are to be completed within the required 125 μsec frame.

Yet another problem arises from the use of PVCS under the current ATM standards. PVCs used to bear the packetized DS-X traffic must be established and maintained by the PBX-specific components (either the access muxes 100 or the communications switch 120), despite the limited ongoing control and management they can exert over the packet network 180. This, coupled with the aforementioned static mapping criteria, makes it difficult for the PBX of FIG. 1 to recover from a lost PVC without dropping all connections and reinitializing.

Therefore, it would be desirable to develop an improved distributed PBX architecture which more efficiently utilizes available packet network bandwidth without materially sacrificing cell delay performance. It would also be desirable to develop a distributed PBX architecture which is more tolerant of connection failures within the packet network.

SUMMARY OF THE INVENTION

In accordance with these and related desires, a novel and nonobvious method for transporting DS-X traffic over a packet network is proposed. Specifically, according to the present invention, virtual connection or slot provisioning and/or cell concentration techniques are used to compact the amount of DS-X traffic broadcast between communications system devices such as the end node and the communications switch to spare bandwidth. In the case of provisioning, a configured DS-X loading of an end node supporting DS-X traffic is ascertained. This configured DS-X loading sets forth the actual loading in terms of digital channels being simultaneously supported and/or number of number of access devices coupled to and being serviced by the end node. In turn, preferably a minimum number of virtual connections for bearing packetized DS-X traffic are established, either at communications system configuration or as needed.

Through provisioning, only the virtual connections needed to support all the digital channels in actual service or the DS-X capacity of all actually-serviced access devices need be established, and packetized DS-X traffic need only flow on those so-established virtual connections. By contrast, conventional virtual connection establishment methods teach that the full capacity of the end node define how many virtual connections to establish and maintain. Thus, through provisioning according to the present invention, bandwidth is spared where the configured capacity of the end node is less than its full capacity such that less total virtual connections are needed to bear the DS-X traffic, even where static slot mapping is utilized.

Compaction of the DS-X traffic bearing cells themselves may be accomplished through concentration processing according to the present invention. In such concentration processing, a dynamic association between the virtual connections and the DS-X traffic is established, typically on a per frame basis. According to this invention, only those digital channels entering the node within a given time frame which actually bear DS-X traffic will be assigned a slot within packet. A DS-X traffic—packet correspondence, such as a slot map, may be compiled and updated as necessary based on the active DS-0 channels within the given frame, and appropriate slot assignment data, such as the updated slot map or any changed assignment data may be exchanged between communication system devices in order to properly compose and decompose the DS-traffic packed in the packets and preserve intended channel connections therebetween.

According to the present invention, concentration processing may be augmented by provision processing to further reduce bandwidth requirements for transporting the packetized DS-X traffic.

In other aspects of the present invention, permanent virtual channels or soft permanent virtual connections established through Private Network-Network Interface management and signalling may be used for the virtual connections where ATM is chosen as the transport protocol. Soft permanent virtual connections are seen as being especially advantageous since their ongoing management and re-routing is performed by the ATM packet network being leveraged by the communications system, rather than the communications system or its components itself.

Also, the present invention contemplates an end node apparatus incorporating these provisioning, concentration processing, and/or virtual connection establishment features to reduce the bandwidth requirements of packetized DS-X traffic flowing into or out of the node.

Other aspects and features of the present invention will become apparent to those ordinarily skilled in the art upon review of the following description of the specific preferred embodiments of the invention in conjunction with the accompanying figures.

BRIEF DESCRIPTION OF THE DRAWINGS

The features of the invention, as well as the invention itself may be best understood with reference to the following drawings, in which like numbers indicate like parts, to which.

DETAILED DESCRIPTION OF THE PREFERRED EMBODIMENTS

Reference will now be made in detail to the preferred implementations and embodiments of the invention, examples of which are illustrated in the accompanying drawings. Wherever appropriate, the same reference numbers will be used throughout the drawings to refer to the same or like parts.

Figure 2:
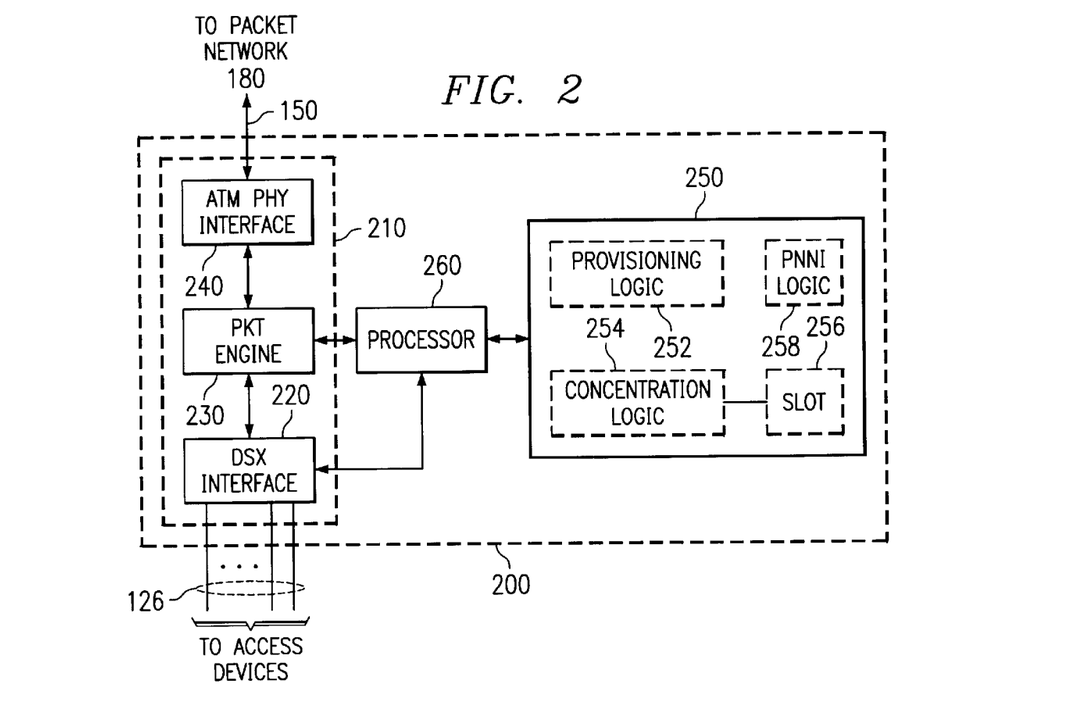
FIG. 2 is a more detailed block diagram of an access multiplexor according to a first embodiment of the present invention.

FIG. 2 is a block diagram of an access multiplexor or mux 200 consistent with a first embodiment of the present invention. Access mux 200 can be conveniently implemented in the distributed PBX architecture of FIG. 1 in place of conventional access mux 100. Like access mux 100, access mux 200 includes processor 260 controlled DS-X to ATM conversion circuit 210. As shown herein, DS-X to ATM conversion circuit 210 includes DS-X interfacing circuit 220 for receiving and transmitting DS-X traffic to and from the ADs 110, 115, 118, a packet engine 230 for composing outgoing ATM cells bearing multiplexed DS0 channels and for decomposing incoming ATM cells into DS0 channels according to a pre-established or negotiated multiplexing format to be discussed in greater detail hereinbelow in connection with provisioning and concentration logic/processing according to the present embodiment. Also, DS-X to ATM conversion circuit 210 includes ATM physical interfacing circuit 240 for operatively coupling to packet network 180 (FIG. 1) and communications switch 120 over ATM link 150 and the aforementioned virtual connections (herein virtual channels, but not exclusively permanent virtual channels, as will be discussed in more detail hereinbelow). This physical interfacing circuit 240 issues outgoing ATM cells composed by the packet engine 230 preferably according to 125 μsec framing constraints and intercepting incoming ATM cells specifying virtual channels terminating at the access mux 200 end node.

As shown in FIG. 2, Processor 260 is coupled to at least the packet engine 230 and DS-X interfacing circuit 220 to control the DS-X to ATM cell conversion process as well as assist in implementing provisioning, concentration, and PNNI soft-PVC connection management methods according to the present embodiment, as will be discussed in greater detail hereinbelow. Access mux 200 will include logic for implementing provisioning, concentration and soft-PVC connection management according to the present invention. As shown in FIG. 2, in the present embodiment this logic will take the form of computer-readable program code statements stored in memory 250 ( provisioning logic 252, concentration logic 254, PNNI logic 258) which cause the access mux 200 to perform provisioning, concentration, and/or PNNI connection establishing processing according to the present embodiment when such statements are executed by the processor 260. As such, processor 260 here is a general purpose information processor (such as a microprocessor) or a special purpose controller (such as a microcontroller) which has sufficient computing resources to at least sequentially execute these program code statements.

Though not shown in FIG. 2, provisioning logic 252, concentration logic 254, and PNNI logic 258 may alternatively reside as program code statements anywhere within the distributed PBX architecture (including packet network 180) as long as they remain accessible to and readable by the processor 260. Alternatively, provisioning logic 252, concentration logic 254, and PNNI logic 258 can also be implemented by the preparation of application-specific integrated circuits or by interconnecting an appropriate network of conventional components, devices and circuits, as will be readily apparent to those skilled in the art.

Provisioning methods according to the present invention will now be discussed with reference to the flowchart of FIG. 4.

Provisioning generally relates to establishing virtual connections, including virtual channels and permanent virtual channels, across the customer's packet network 180 which are required to support the current DS-X loading of the access mux 200 which can be ascertained, for example, through determining the number of access devices or the number of simultaneous DS-0s being serviced by the access mux 200 at any given time. By contrast, the conventional approach has been to tailor PVC allocation to the worst case fully loaded environment (assuming active DS-X traffic on every possible DS-0 channel the access mux can handle). This is, of course, rarely the operational case for such distributed communication systems.

According to the present invention, two specific provisioning methods are utilized. In the first method, a PVC is established for each access device coupled to the access mux 200. PVCs will only be established as access devices are added. Also, PVCs will be relinquished when access devices are to be no longer serviced by the access mux 200. Preferably, though not required, a PVC to single access device correspondence is used to simplify identification of a changed DS-X loading therefor, Since most conventional access devices have a DS-X capacity which does not exceed 48 DS-0 channels, this will typically be a single . Accordingly, this will be referred to as virtual connection per access device provisioning.

An alternative provisioning method establishes virtual connections based on the number of simultaneous DS-0 channels supported by the access mux as determined typically at initialization. As will be discussed in more detail hereinbelow, this provisioning method is more bandwidth sparing (requires less virtual connections) than in the virtual connection to AD provisioning, since only one VC will transmit end-padding as in the conventional case. But it comes at the expense of a more complicated configuration, and so for this embodiment is performed only at system initialization. This type of provisioning will be hereinafter referred to as supported DS-0 provisioning.

Figure 6A:
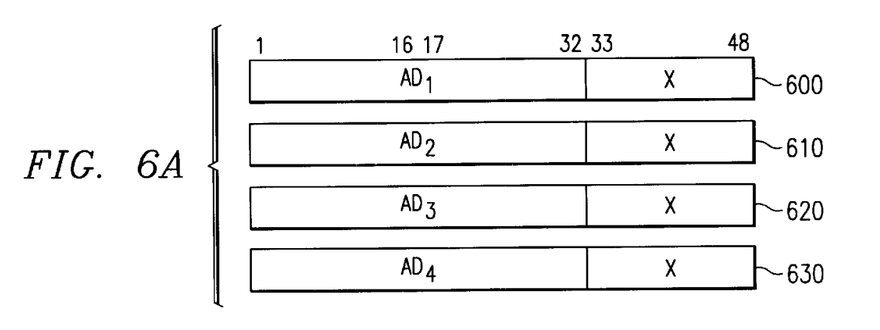
FIG. 6A diagrammatically illustrates an example of DS0 mapping after "PVC—AD" provisioning according to the first embodiment of the present invention.

Consider the following example. As before, assume the access mux 200 has a capacity of handling 16 simultaneous access devices, each supporting 32 simultaneous DS-0 channels. Further assume, that despite this capacity only four access devices are in fact coupled to the access mux and available for use. Using virtual connection per AD provisioning according to the present embodiment, four virtual channels would be established within the customer's packet network 180 (one virtual channel per access device). Since the number of simultaneous DS-0 channels supported by each access device is typically less than the maximum 48 DS-0 that can be placed in the single cell payload borne by each established virtual channel, padding is used to fill out the cell as is known in the art. Thus, the mapping in FIG. 6A is realized, showing four virtual channels 600, 610, 620 and 630 each mapping the DS0 channels for single access device AD1 through AD4 respectively and with octet padding denoted by X and using the well-known first available cell fill pattern.

In this example, only four ATM cells are needed per 125 microsecond frame to carry all the DS-X traffic in the current configuration so only 13.6 megabits per second of bandwidth need be utilized. In the conventional case, as discussed hereinabove, 11 virtual channels and 37.3 Mbits/sec would be needed to map the same DS-X loading.

Figure 6B:
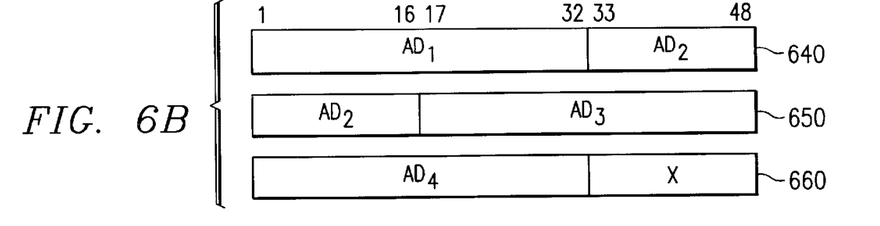
FIG. 6B diagrammatically illustrates an example of DS0 mapping after "supported-DS0" provisioning according to the first embodiment of the present invention.

Alternatively, as shown in FIG. 6B, if supported DS provisioning according to the present embodiment is utilized, only three virtual channels need be established if each access device supports a maximum 32 simultaneous DS-0s.

Figure 4:
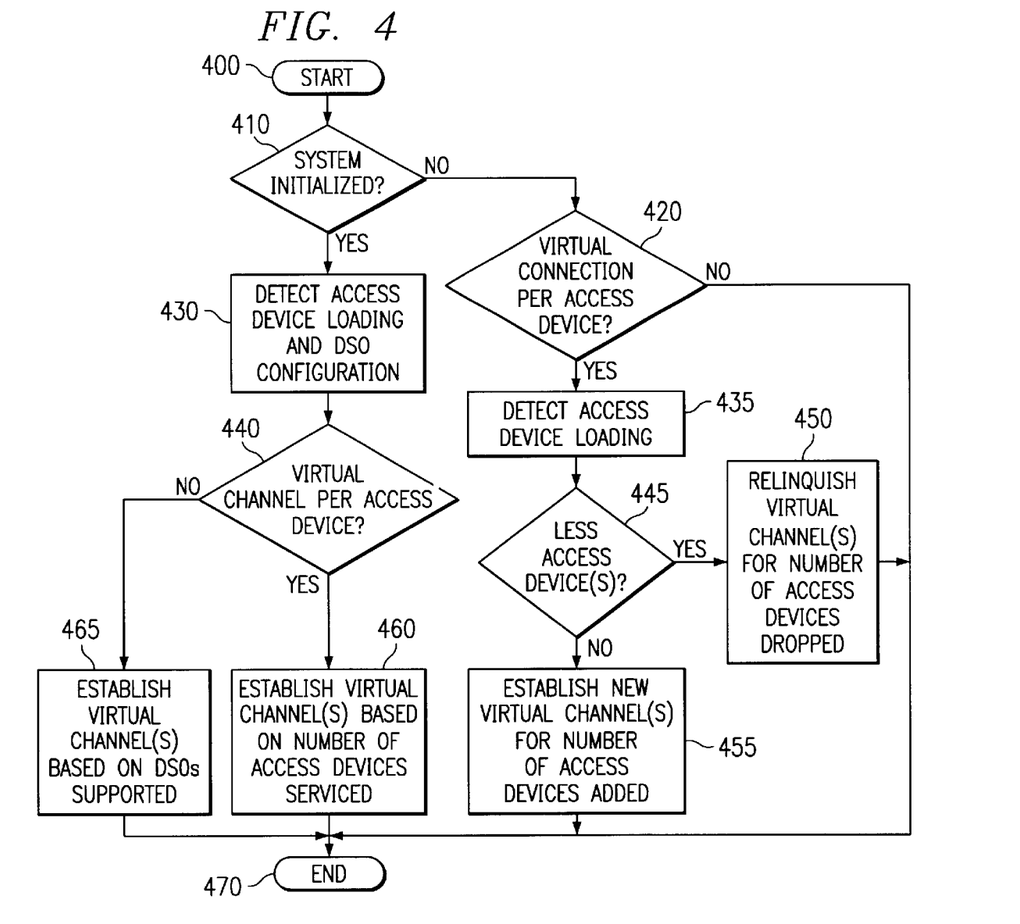
FIG. 4 is a flowchart detailing provisioning logic processing according to the first embodiment of the present invention.

FIG. 4 illustrates provisioning logic processing carried out by the access mux end node 200 of the present embodiment. Control begins at step 400, and thereafter passes to step S410 in which it is determined whether the access mux 200 is at system initialization. This determination is used to separate out whether ongoing provisioning can be used once the initial virtual channel configuration has occurred. As discussed above, virtual connection per AD provisioning conveniently permits ongoing provisioning as access devices are added to or moved from the access mux 200. However, supported DS-0 provisioning is performed only once in this embodiment during system initialization. Thus, in step S410, it is determined that we are not at system initialization, control passes to step S420 in which the determination is made whether virtual connection per AD provisioning is utilized. If not, on-the-fly provisioning is not available, so control passes to step S470 and provisioning terminates naturally. If however, in step S420 a determination is made that virtual connection per AD provisioning is to be utilized, control instead passes to step S445 in which a determination is made whether access devices are no longer be serviced (or placed out of service by the distributed communications system) If so, control passes to step S450 in which the access mux 200 directs the packet network to relinquish the virtual channel servicing the access device(s) being dropped using known ATM management action techniques. Thereafter, control passes to step S470 and provisioning processing according to the present embodiment terminates naturally.

However, in step S445, additional ADs are determined to be serviced, control instead passes to step S455 in which new VCs are established corresponding to the ADs being added to the system. Control thereafter terminates naturally at step S470.

Still referring to FIG. 4, if in step S410 it is determined that the communications system is still undergoing system initialization, control instead passes to step S430 in which the access mux 200 detects the number of access devices it is to support and the configured DS-X loading on each access device using known techniques (e.g., through retrieving access device "I'm alive" configuration information detected by DS-X interface circuit 220 (FIG. 2)). Once the configured DS-X loading has been retrieved, control passes to step S440 in which a determination is made whether virtual channel per access device provisioning according to the present embodiment is to be utilized. If so, control passes to step S460 in which virtual channels are based on the number of access devices being serviced as discussed above. Control thereafter provisioning and processing terminates naturally at step S470.

If, however, in step S440 it is determined that virtual connection per AD provisioning is not to be utilized, meaning that supported DS-0 provisioning will instead be utilized, control instead passes to step S465 in which VCs are established based on the number total number of DS0s being supported. Control thereafter terminates naturally at step S470.

In an alternative embodiment, ongoing provisioning using the aforementioned supported DS-0 provisioning may be utilized. In such case, a determination would made whether the net number of the DS-0 channels after the change exceeds the capacity of the established virtual channels using first available fill, single octet per DS0 channel mapping, or if the net number of DS-0 channels being serviced results in a lower net number of virtual channels required to bear the supported DS-0 channels.

Concentration methods according to the present embodiment will now be discussed with reference to FIGS. 5 and 7. Concentration processing allows even more densely packed ATM cells to be transmitted since only DS-0 channels bearing traffic within the 125 microsecond frame would be mapped into the virtual channel cell. Of course, doing so requires dynamic association of VCs into DS-0 channels and therefore a slot map or channel identification signalling similar to that specified in Recommendation Q.931 of the ITU-T ISDN Digital subscriber Signalling System No. 1, Network layer, user-network management (i.e. the "ISDN Blue Book"), which is incorporated herein fully by reference. In this embodiment, channel assignment data, including channel (slot) mapping for every transmitted cell, a number of changed cells or only changed slot assignments will preferably use a control virtual channel between the access mux 200 and the communication switch 120 separate and apart from the DS-X traffic bearing virtual channel(s), or can be imbedded in a portion of the DS-X traffic bearing channels themselves at the expense of bandwidth (since six octets would be required to map each cell in expanded form). Otherwise, the communication switch 120 will not know how to treat and switch the incoming DS-0 channels or know what connections they represent. Even with concentration processing, first available cell fill, 125 μsec framing and single DS-0 byte slots techniques are preserved.

Concentration processing according to the present embodiment may be best understood by considering the following example. Again considering the case where only four 32 channel access devices are being serviced by access mux 200, at most 4 PVCs would be required to relay the DS0 connection as shown in FIG. 6A when provisioning according to the present embodiment is used. In this case, further assume that the traffic within a given 125 microsecond frame, access device $AD_1$ 110 (FIG. 1) only bears 5 active DS-0 channels, $AD_2$ 115 experiences traffic on all 32 DS-0 channels, $AD_3$ (not shown) bears traffic only on 6 channels and $AD_4$ (not shown) has no traffic despite its 32 channel capacity. Thus, from the context of the given time slice, only five octets of a virtual channel are needed to bare the DS-0 channels for $AD_1$, 32 octets are required to transport the 32 active DS-0 channels on access device $AD_2$ and $AD_3$ requires only 6 octets of a virtual channel cell. $AD_4$, of course, requires no octets within the given time slice.

Figure 7:
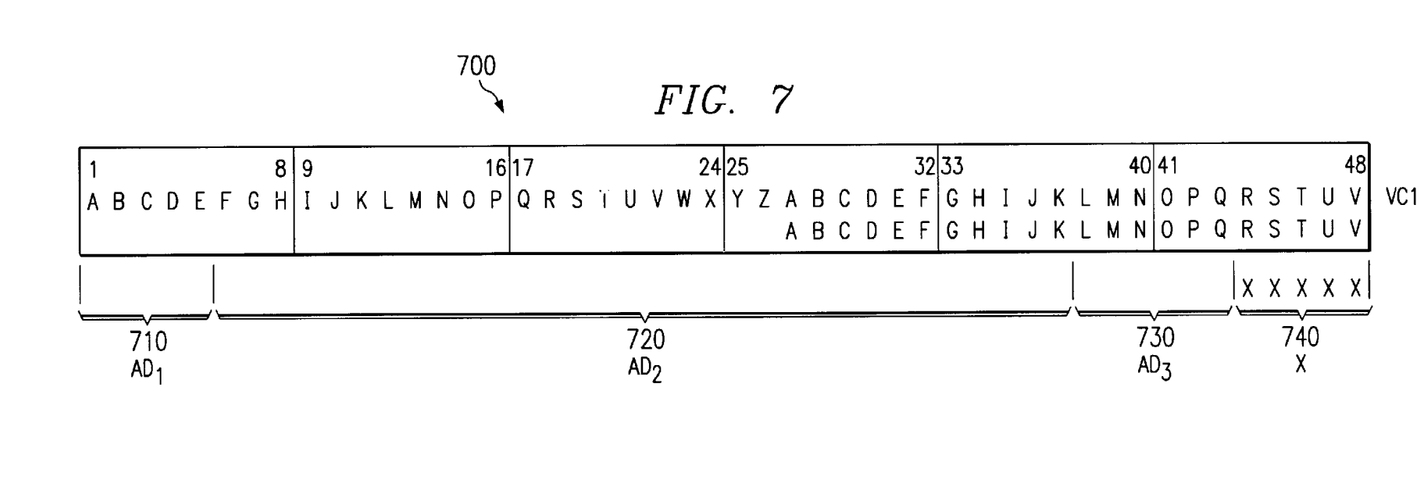
FIG. 7 diagrammatically illustrates an example of DS0 mapping after concentration according to the first embodiment of the present invention.

The consequence of concentration processing, this example is shown with reference to FIG. 7. VC1 is capable of bearing the actual DS traffic encountered by the access mux 200 at the given timeslice. Remaining virtual channels need not be established, or, in the case of permanent virtual channels, while persisting do not bear any traffic thereby potentially freeing up bandwidth to competing traffic.

A more detailed description of concentration processing according to the present embodiment will now be discussed with reference to FIG. 5. Preferably this processing occurs once per frame.

Control begins at step S500 and passes to step S505, in which, for each frame, incoming ATM DS-X cells borne by the established virtual channel(s) are received and latched into the ATM physical interface 240 of access mux 200. Also, at this step, outbound DS-X traffic originating from the access devices 110,115, 118 serviced by the access mux 200 are collected at the DS-X interface 220. Thereafter control passes to step 510 in which a determination is made whether slot map changes are necessary. As mentioned previously, the slot map 256 (FIG. 2) keeps a running DS-0 channel or connection to VC cell slot mapping so the access mux 200 can properly compose and decompose outbound and inbound ATM cells bearing DS-X traffic. As shown in FIG. 2, the slot map 256 is preferably locally contained in mux memory 250. A mirror of this slot map 256 is preferably made accessible to the communications switch 120 so it can track the slot assignments for this access mux 200 and complete switching responsibilities therefor. It should also be noted that the communications switch 120 includes a mirror slot map for each access device 100, 200 it is servicing.

Turning back to FIG. 5, In this embodiment, the slot change determination required in step 510 is implemented by comparing the outbound DS-X traffic to the existing slot map 256 as well as querying any perceived slot assignment data, including changed assignment data, received from the communications switch 120 via a control VC cell, a message embedded in one or more of the DS-X bearing VC cells, or other control signalling protocols and formatting techniques known in the art. If, in step 510 a determination is made that slot map changes have occurred, control passes to step 515. At step 515, a determination is made whether there are a sufficient number of available slots to support all outbound DS-X traffic. This assumes a design limitation that a finite number of slots are available at any given time since only a finite number of VCs have been established or reserved, either through provisioning or conventional configuration techniques. It should be realized that slot sufficiency is only an issue with respect to outbound DS-X traffic (namely, DS-X traffic originating in the access devices 110, 115, 118 entering the access mux 200 via signal lines 120 (FIG. 2) since the communications switch 120, having knowledge of the slot map for access mux 200, would not overload the established capacity between it and the access mux 200.

If, in step 515, it is determined that sufficient slots are available to handle the outbound DS-X traffic, control passes to step 525 in which the slot map is updated to show the new slot reservations selected preferably using the first available fill allocation technique. Control thereafter passes to step 540 in which slot assignment data (herein, either changed assignment data or an updated slot map) is compiled based on the updates made in step 525, and such data is relayed to the communications switch 120.

Figure 5:
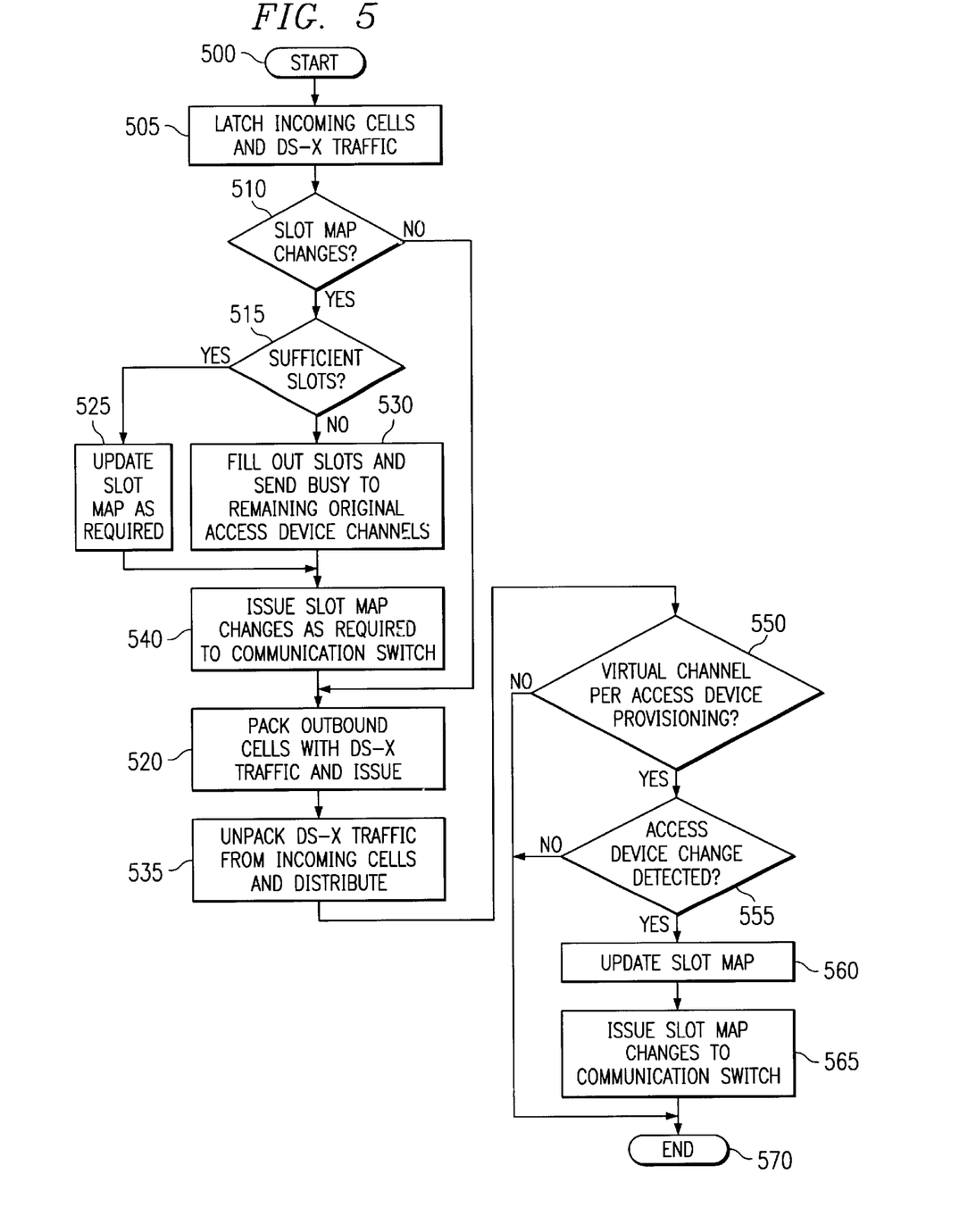
FIG. 5 is a flowchart detailing concentration logic processing according to the first embodiment of the present invention.

Control thereafter passes to step S520 as shown in FIG. 5.

If, however, in step 515, it is determined that sufficient VC cell slots are not available to handle all of the outbound DS-X traffic received by the DS-X interface 220 of the access mux 200, control instead passes to step 530, in which all the available slots are allocated using DS-X priority or similar known blocking technique and the access mux 200 issues a busy signal over the remaining (not allocated) DS-X traffic lines. Control thereafter passes to step 540, in which slot assignment data indicating a full established VC capacity is compiled and relayed to the communications switch 120. Thereafter, control passes to step 520 detailed hereinbelow.

If, however, in step 510 it is determined that no slot map changes are required, control instead falls through to step 520.

At step 520, the processor 260 directs the packet engine 230 to pack the outbound DS-X traffic into established VC cells according to the slot map 256. Thereafter, control passes to step 535, in which inbound DS-X traffic packed within the payload of the ATM VC cells received and latched by the ATM physical I/F 240 is unpacked according to the slot map 256. Control thereafter passes to step 550, in which a determination is made whether virtual channel per access device provisioning (discussed hereinabove) is utilized in conjunction with concentration processing according to the present embodiment. If so, control passes to step 555, in which the quantity of access devices is determined to have been changed, and if so, update the slot map (560) and upload slot assignment data signifying the loss or gain of VC(s) to the communication switch 120 (565). Thereafter, control passes to step 570, and concentration processing according to the present embodiment for a given frame terminates naturally.

If, however, in step 550 it is determined that virtual channel per access device provisioning is not being utilized, or in step 555 it is determined that the number of access devices being simultaneously serviced by the access mux has not changed, control instead passes to step 570 without the need to update the slot map (560) or issue the slot assignment data to the communications switch (565).

To increase the reliability and robustness of DS-X transport through the packet network 180, permanent or switched virtual channels established between the communications switch and the access mux 200 may be replaced by soft-permanent virtual connections (soft PVCs) where possible as established by known Private Network to Network Interface (PNNI) signalling techniques and PNNI management of packet network 180. This assumes, of course, that packet network 180 is PNNI compatible, meaning that it conforms to and implements the recommendations set forth in the ATM Forum's PNNI Specification 1.0 (March 1996), including Annex C thereof pertaining to soft permanent virtual connection procedures, which is incorporated herein fully by reference.

If soft PVCs are to be utilized with or without concentration and/or provisioning processing according to the present embodiment, the communications switch 120 and access muxes 200 may retain permanent or switched virtual channels between edge switches (not shown) within packet network 180 they are connected to via links 170 and 150 respectively. These PBX components, particularly access muX 200, will then direct one or both of these edge switches to establish a corresponding number of soft PVCs to bear the DS-X traffic therebetween within the packet network 180 using procedures set forth in Annex C of the PNNI specification.

The advantage of using soft-PVCs here is that once the soft-PVCs are established using these PNNI techniques, management of the virtual connections by PBX devices terminates at these edge switches, and the packet network 180 manages the soft PVC connections and reroutes them independently of PBX device action (such as when a switched virtual connection is lost). This greatly simplifies configuration as well as ongoing management of virtual connections by the PBX devices, particularly as compared to true permanent virtual channel establishment and maintenance heretofore utilized in the art.

In the above-described embodiments, ATM was assumed to be the transport protocol for communications between the PBX devices over the packet network 180. However, the teachings of the present invention are not believed to be limited to such a transport environment, and in fact these teachings can be expanded to any type of packet network (such as an IP network) capable of bearing multiplexed DS-X traffic in either static or dynamically-sized packets, particularly if one or more virtual connections (or an appropriate connection analogue) is used to bear the packetized traffic therein.

While the invention is described above in terms of specific preferred embodiments and associated drawings, those of ordinary skill in the art will recognize that the invention can be practiced in other embodiments as well. It is felt therefore that the invention should not be limited to the disclosed embodiments, but rather should be limited only by the spirit and scope of the appended claims.

What is claimed is:

1. In a distributed communications system leveraging a packet network bearing packets having a uniformly sized payload, a method for multiplexing DS-X traffic into the packets, comprising the steps of:

determining active DS-X traffic entering a communications system node at a given unit time;

developing a DS-X-packet correspondence based on the active DS-X traffic, the DS-X-packet correspondence defining a minimum number of the packets to bear the active DS-X traffic; and mapping the active DS-X traffic into the payload of at least one of the packets according to the DS-X-packet correspondence.

2. A method for transporting DS-X traffic across a packet network, comprising the steps of:

providing an end node coupled to the packet network for receiving DS-X traffic;

establishing plural virtual connections within the packet network terminating in the end node, each virtual connection bearing a packet per unit time, each packet having a uniformly-sized payload;

determining active DS-X traffic entering the end node at a given unit time;

developing a multiplexing map based on the active DS-X traffic, the multiplexing map setting forth a minimum number of the packets required to transport the active DS-X traffic;

mapping the active DS-X traffic into at least one of the packets according to the multiplexing map;

issuing the at least one mapped packet across the established virtual connection corresponding thereto.

3. The method of claim 2, further comprising the steps of:

providing a communications switch coupled to the packet network, the established virtual connections terminating at the switch; and relaying slot assignment data based on the DS-X-packet map to the communication switch.

4. The method of claim 3, wherein the slot assignment data comprises a slot map of the at least one mapped packet.

5. The method of claim 3, wherein the slot assignment data comprises changed assignment data of the at least one mapped packet.

6. The method of claim 2, wherein said virtual connection establishing step comprises:

determining a quantity of access devices serviced by the end node; and establishing the virtual connections for each access device serviced by the end node.

7. The method of claim 2, wherein said virtual connection establishing step comprises:

determining a quantity of DS0 channels being simultaneously serviced by the end node; and establishing the virtual connections based on the quantity of simultaneously serviced DS0 channels.

8. The method of claim 2, wherein the packets comprise ATM cells; and the virtual connections comprise virtual channels.

9. The method of claim 8, wherein the virtual connections comprise permanent virtual channels.

10. The method of claim 8, wherein the virtual connections comprise soft permanent virtual connections.

11. An end node for placing DS-X traffic on a packet network, comprising:

a processor;

a DS-X interface in communication with said processor, said DS-X interface for receiving DS-X traffic;

a packet engine in communication with said processor and said DS-X interface, said packet engine for converting received DS-X traffic into packets according to processor control, the packets having a uniformly-sized payload;

a memory in communication with said processor, said memory including computer readable program statements causing said processor to perform the following steps when said program statements are executed by said processor, the steps comprising:

determining active DS-X traffic asserted on said DS-X interface at a given unit of time;

developing a multiplexing map based on the active DS-X traffic, the multiplexing map setting forth a minimum number of the packets required to transport the active DS-X traffic; and controlling the packet engine to map the active DS-X traffic into at least one of the packets according to the DS-X-packet multiplex map; and a packet network interface in communication with said packet engine for issuing the at least one mapped packet onto the network.

12. An end node for placing DS-X traffic on a packet network, comprising:
- a processor;
- a packet network interface in communication with a packet network and said processor;
- a DS-X interface in communication with said processor, said DS-X interface for receiving DS-X traffic;
- a memory in communication with said processor, said memory including computer readable program statements causing said processor to perform the following steps when said program statements are executed by said processor, the steps comprising:
  - determining a configured DS-X loading of the end node; and
  - communicating with the packet network to establish at least one virtual connection within the packet network based on the DS-X loading; and
- a packet engine in communication with said processor and said DS-X interface, said packet engine for converting received DS-X traffic into packets, wherein said packet network interface issues packets through the established at least one virtual connection.

13. An end node, comprising:
- a DS-X interface for receiving DS-X traffic;
- a packet engine in communication with said DS-X interface, said packet engine for converting received DS-X traffic into packets, the packets having a uniformly-sized payload;
- means for determining active DS-X traffic asserted on said DS-X interface at a given unit of time;
- means for developing a multiplexing map based on the active DS-X traffic, the multiplexing map setting forth a minimum number of the packets required to transport the active DS-X traffic;
- means for controlling the packet engine to map the active DS-X traffic into at least one of the packets according to the DS-X-packet multiplex map; and
- a packet network interface in communication with said packet engine for issuing the at least one mapped packet onto a packet network.

14. The end node of claim 13, further comprising
- means for determining a configured DS-X loading of the end node;
- means for communicating with the packet network to establish at least one virtual connection within the packet network based on the DS-X loading;
- wherein said packet network interface issues the at least one mapped packet through the established at least one virtual connection.

* * * * *